United States Patent [19]

Springer et al.

[11] Patent Number: 4,549,829
[45] Date of Patent: Oct. 29, 1985

[54] TRUNNION FOR HOOK AND BLOCK ASSEMBLY

[75] Inventors: Richard E. Springer, Tulsa; Gary R. Baxter, Owasso, both of Okla.

[73] Assignee: The Crosby Group, Inc., Tulsa, Okla.

[21] Appl. No.: 422,604

[22] Filed: Sep. 24, 1982

[51] Int. Cl.⁴ .................................................. F16D 3/16
[52] U.S. Cl. ........................................ 403/57; 403/78; 59/95; 464/134
[58] Field of Search .................... 403/53, 57, 165, 78, 403/74, 67; 59/95; 464/134, 133

[56] References Cited
U.S. PATENT DOCUMENTS

| 719,411 | 1/1903 | Bocorselski | 464/134 |
| 1,514,942 | 11/1924 | Whitten | 464/133 X |
| 2,170,315 | 8/1939 | Wonderly | 464/134 |
| 2,493,282 | 1/1950 | Criswell | 59/95 |
| 3,650,123 | 3/1972 | Sheppard, Jr. | 464/133 |
| 3,897,833 | 8/1975 | Frisbee | 403/67 X |
| 4,074,519 | 2/1978 | Garrett | 403/164 X |

Primary Examiner—Andrew V. Kundrat
Attorney, Agent, or Firm—Head, Johnson & Stevenson

[57] ABSTRACT

A trunnion assembly to interconnect the shank of a hook to a block, like a pulley block, includes trunnion pins that are assembled through the inner bore of a trunnion body and moved outward to extend from the bore into depending side plates of the block assembly and thus rotatably support the trunnion body and lock the pins in place.

9 Claims, 10 Drawing Figures

U.S. Patent  Oct. 29, 1985  Sheet 1 of 4  4,549,829
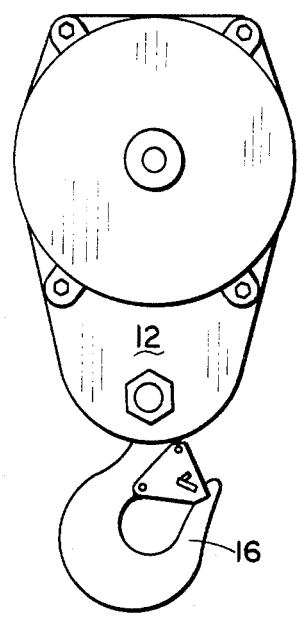
Fig. 1
(PRIOR ART)
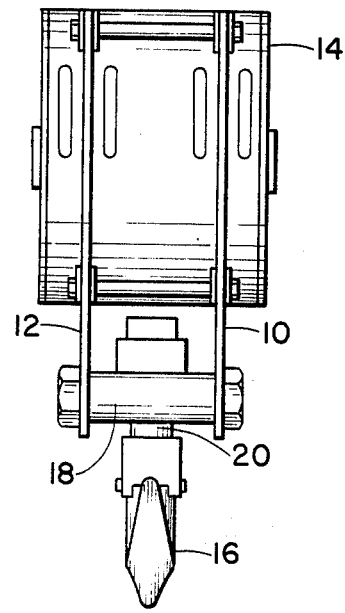
Fig. 2
(PRIOR ART)
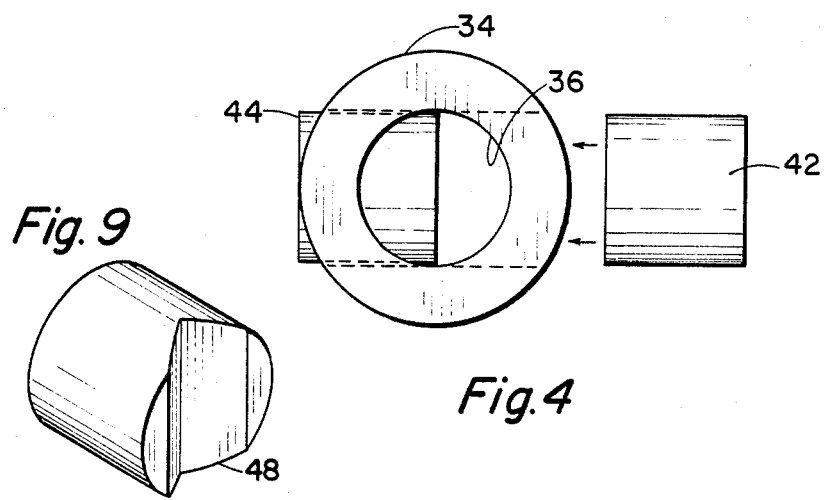
Fig. 9
Fig. 4

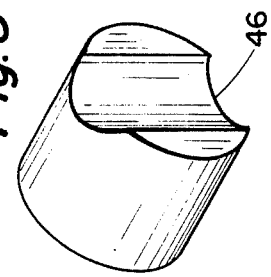
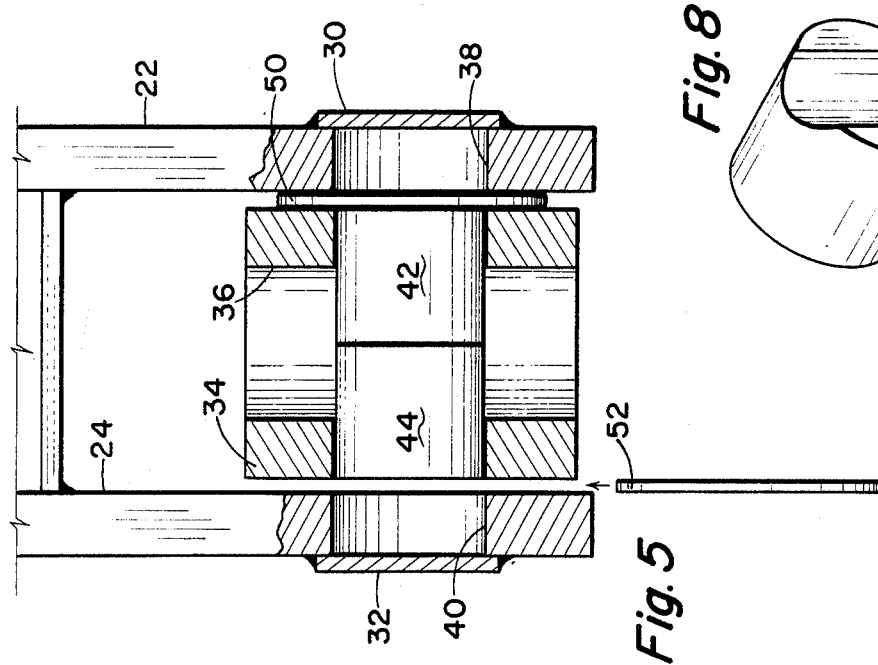
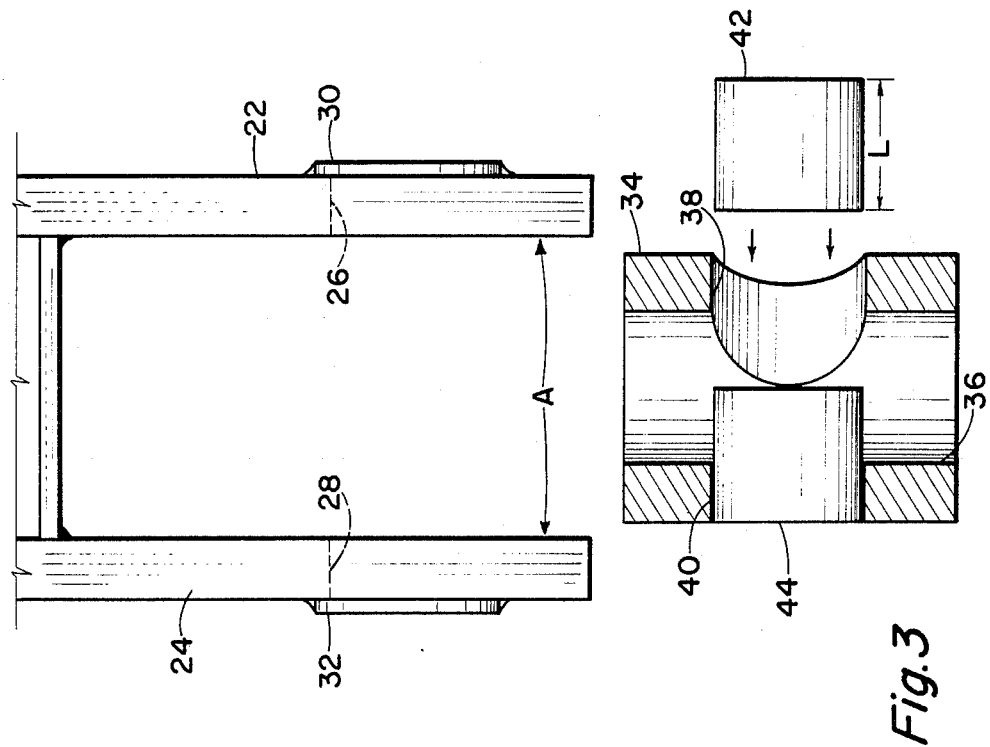

TRUNNION FOR HOOK AND BLOCK ASSEMBLY

SUMMARY OF THE INVENTION

The invention is directed to a trunnion connection for a hook and block assembly. An object of the invention is to provide an easily assembled trunnion which permits rotational motion of a hook relative to the block about two transverse axes, and wherein the trunnion bearing pins are locked in place by the shank of the hook.

The invention is adaptable to most blocks which have parallel spaced side plates depending from the block to retain a hook. In many instances of use it is desirable that the hook, to which articles, such as, wire line slings or other lifting mechanism are attached, be rotatable about a vertical as well as a horizontal axis. In this invention the depending side plates include axially aligned openings. The openings are closed to the exterior of the side plates. A trunnion body has a first or vertical bore therethrough to receive the shank of a hook. A second or horizontal bore across the trunnion body is alignable with the axially aligned openings in the side plates. Two trunnion pins of diameter to be rotatably received in said second bore and axially aligned openings are of length such that in pre-assembly the trunnion pins are positionable in said second bore so as to not extend beyond the plane of the outside dimension of the trunnion body. When the pre-assembled body is positioned between the side plates opposite the aligned openings the trunnion pins are moved outward thereinto, the same said length being such as to rotatably support said trunnion body. In this assembled condition the first or vertical bore is open to receive the shank of the hook which is then rotatably retained to the trunnion body.

BRIEF DESCRIPTION OF THE DRAWINGS

FIGS. 1 and 2 are side and edge elevational views of a typical block and hook assembly of the prior art.

FIG. 3 is a segmented edge view partly sectioned describing the invention in the pre-assembly thereof.

FIG. 4 is a top view of the trunnion body and pin pre-assembly taken along the lines 4—4 of FIG. 3.

FIG. 5 is a part sectioned view of the second stage of assembly of the invention.

FIGS. 8 and 9 are perspective views of alternate types of trunnion pins for use in this invention.

DETAILED DESCRIPTION OF THE PREFERRED EMBODIMENT

Figure 7:
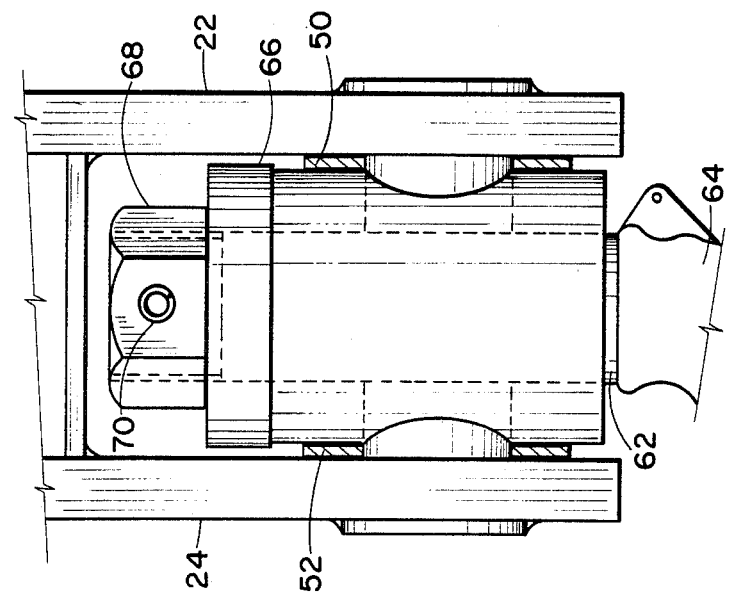
FIG. 7 is an edge elevational view of the finally assembled hook and block.

Before explaining the present invention in detail, it is to be understood that the invention is not limited in its application to the details of the construction and arrangement of parts illustrated in the accompany drawings. The invention is capable of other embodiments and of being practiced or carried out in a variety of ways. It is to be understood that the phraseology and terminology employed herein is for the purpose of description and not of limitation.

An assembled hook and block typical of the prior art is shown in FIGS. 1 and 2. The parts include parallel side plates 10 and 12 which support the block 14 which houses rotatable or journalled wire line sheaves, not shown. A hook 16 is supported by a bolted sleeve 18 through which the shank 20 of hook 16 extends and is retained. The hook can rotate about the shank 20 axis and about the sleeve 18 axis.

In this invention as shown in FIG. 3 the assembly includes parallel block side plates 22 and 24 which depend downwardly from a block not shown. Each plate includes respective axially aligned openings 26 and 28, shown dotted in this view. The openings may either be blind holes or are covered as shown by welded stop plates 30 and 32 on the exterior of respective side plates 22 and 24. That is, the opening 26 and 28 face the interior of the side plates. The invention includes a trunnion body 34 having a first or vertical bore 36 and a transverse or second or horizontal bore forming portions 38 and 40. In the first stage of pre-assembly of the invention respective and identical trunnion pins 42 and 44 are positioned in the trunnion body bores 38 and 40.

The length L of the pins 42 and 44 are such that when pre-assembled in the body 34 they will be no greater in total width A between the side plates 22 and 24.

Figure 6:
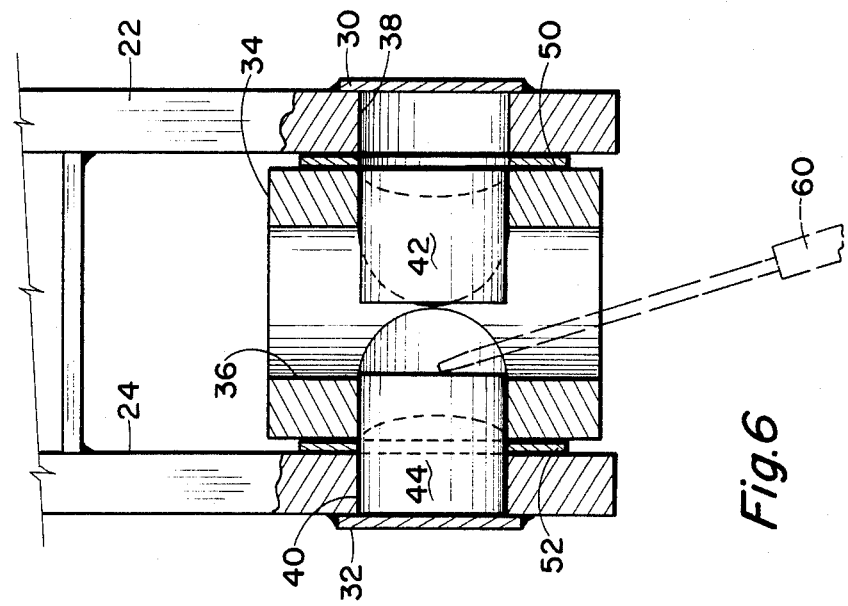
FIG. 6 is a part sectional view showing a third stage of assembly.

FIG. 5 is a partial section view of a second stage of assembly of the invention, wherein the trunnion body 34 with pre-assembled pins 42 and 44 are positioned between side plates 22 and 24. Typically spaced washers 50 and 52 may be positioned as shown but are not required. Thence as shown in FIG. 6 pin 44 is pushed outwardly into opening 40 using fingers or a screwdriver 60 shown dotted, then pin 42 is done likewise. The trunnion body is now rotatably supported by the pins 42 and 44 and is ready to receive the shank 62 of hook 64 partially shown in FIG. 7, into vertical bore 36. The shank is rotatably retained by a thrust bearing 66 and threaded nut 68 held by a spring pin 70 which passes through aligned holes in the nut and hook shank.

To disassemble, the spring pin 70 is removed and nut 68 removed along with thrust bearing 66. The hook 64 and its shank 62 are removed. The trunnion pins 42 and 44 are moved to the center of trunnion body 34 where the washers and the body are removed from the side plates 22 and 24.

Although plates 30 and 32 are described as solid in the preferred embodiment other means to inhibit outer movement of the pins 42 and 44 are inclusive of the invention.

Figure 10:
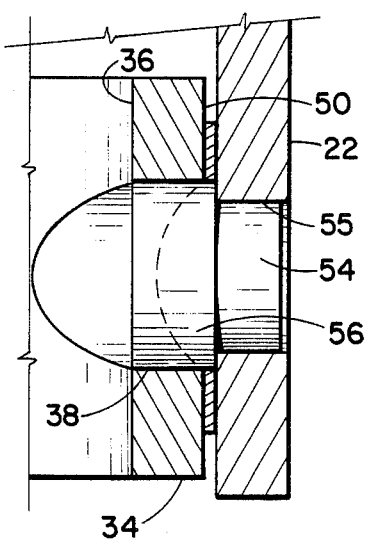
FIG. 10 is a partial section view of a further alternate embodiment.

FIGS. 8, 9 and 10 represent alternate embodiments of trunnion pins capable of use in the invention. In FIG. 8 the pin includes a curved recess 46 while the trunnion pin of FIG. 9 has a V-groove 48 each of which, when assembled, will be locked from rotation by the shank 62.

The embodiment of FIG. 10 eliminates the need for cover plates 30 and 32. The trunnion pins comprises a small diameter portion 54, which is received in opening 55 in the side plate 22, and a larger diameter portion 56, which is received in bore 38 of the trunnion body 34, and when assembled is locked from any axial movement.

Although a hook 16 is shown, it is to be understood that the term includes other types of mechanisms used in the hoisting art.

What is claimed is:

1. A trunnion assembly for interconnecting a hook shank and block comprising:

a pair of spaced block side plates, each having an outside and an inside surface, axially aligned openings in each of said side plates;

a trunnion body having a first bore therethrough to receive said shank of said hook, a second bore in said trunnion body transverse to said first bore to receive trunnion pins, means to maintain said trunnion pins non-rotatably positioned to said trunnion body on each side of said shank, each of said trunnion pins of length to extend from the periphery of said first bore into said aligned opening in each of said side plates, said trunnion pins rotatable relative to said side plates; and means to rotatably retain said shank of said hook in said first bore of said trunnion body.

2. An assembly of claim 1 wherein a spacer washer is positioned about each trunnion pin between said trunnion body and each inside surface of said side plates.

3. An assembly of claim 1 wherein said means to rotatably retain said shank includes a thrust bearing and a threaded nut at the end of said shank.

4. A trunnion assembly of claim 1 wherein each of said trunnion pins have a small diameter portion to be received in the respective axially aligned openings of said side plates and a larger diameter portion positioned substantially in the respective second bore of said trunnion body.

5. An assembly of claim 1 wherein each of said trunnion pins includes a recess adjacent said first bore of said trunnion body which receives said shank therein to prevent rotation of said pins.

6. An assembly of claim 5 wherein said recess is curved to conform to the peripherial surface of said shank.

7. An assembly of claim 5 wherein said recess is a V-shaped groove.

8. An assembly of claim 4 wherein each of said trunnion pins includes a recess adjacent said first bore of said trunnion body which receives said shank therein to prevent rotation of said pins.

9. An assembly of claim 1 wherein said axially aligned openings in said side plates are covered on said outside surfaces.

* * * * *